United States Patent [19]
Mori et al.

[11] Patent Number: 5,737,111
[45] Date of Patent: Apr. 7, 1998

[54] OPTICAL RECEIVING APPARATUS

[75] Inventors: Kazuyuki Mori; Kohei Shibata, both of Kawasaki, Japan

[73] Assignee: Fujitsu Limited, Kawasaki, Japan

[21] Appl. No.: 777,647

[22] Filed: Dec. 31, 1996

[30] Foreign Application Priority Data

Jul. 2, 1996 [JP] Japan .................... 8-172219

[51] Int. Cl.$^6$ .................................. H04B 10/06
[52] U.S. Cl. .................... 359/194; 359/198; 250/214 A
[58] Field of Search .................... 359/189, 194, 359/161; 250/214 A, 214 LA; 375/319, 346, 345

[56] References Cited

U.S. PATENT DOCUMENTS

| | | | |
|---|---|---|---|
| 5,371,763 | 12/1994 | Ota et al. | 375/319 |
| 5,430,766 | 7/1995 | Ota et al. | 375/318 |
| 5,532,471 | 7/1996 | Khorramabadi et al. | 250/214 A |

FOREIGN PATENT DOCUMENTS

| | | |
|---|---|---|
| 57-74523 | 5/1982 | Japan . |
| 61-28236 | 2/1986 | Japan . |
| 61-267404 | 11/1986 | Japan . |
| 63-276310 | 11/1988 | Japan . |

*Primary Examiner*—Kinfe-Michael Negash
*Attorney, Agent, or Firm*—Staas & Halsey

[57] ABSTRACT

An optical receiving apparatus is provided which is constructed to compensate for a rise in offset level attributable to low-frequency response of a light-receiving device. An offset detecting circuit detects a quantity of electricity indicative of an offset current quantity which corresponds to the zero level of an optical signal within the current quantity output from the light-receiving device, and a current subtracting circuit reproduces the offset current quantity based on the detected quantity of electricity, subtracts the reproduced offset current quantity from the current quantity output from the light-receiving device, and supplies the result to a preamplifier.

8 Claims, 16 Drawing Sheets

OPTICAL RECEIVING APPARATUS

BACKGROUND OF THE INVENTION

(1) Field of the Invention

The present invention relates to an optical receiving apparatus for receiving an optical signal and converting the received signal to an electrical signal, and more particularly, to an optical receiving apparatus for compensating for a rise in offset level attributable to low-frequency response of a light-receiving device.

(2) Description of the Related Art

In recent years, optical communications are attracting attention because of an increasing amount of information transmission. In optical communications, an optical receiving apparatus for receiving a pulsed optical signal and converting the received signal to an electrical signal is one of apparatus that provide primary functions.

Generally, a light-receiving device constituting the optical receiving apparatus involves low-frequency response, and this low-frequency response causes the offset level of the electrical signal output from the light-receiving device, which level corresponds to the zero level of the pulsed optical signal, to rise with lapse of time.

The structure of the light-receiving device is considered one of the causes of the low-frequency response. Specifically, in FIG. 13 showing a sectional structure of a PIN photodiode which is generally used as a light-receiving device, the PIN photodiode comprises three layers, that is, a P layer, an I layer (depletion layer) and an N layer, the I layer is sandwiched between the P and N layers, and voltages are applied to the P and N layers. When light is received by the I layer, carriers are generated, are accelerated by the electric field developed between the P and N layers, and reach the anode or cathode side of the light-receiving device. Consequently, the input light is converted to an electrical signal.

The electric field strength is low in regions which are distant from the voltage-applied electrode in the plane direction, and also in such I-layer regions acted upon by a low-strength electric field, carriers are generated due to the incidence of light. These carriers are scarcely accelerated by the electric field, and reach the anode or cathode side of the light-receiving device while gradually diffusing. As a result, the light-receiving device has a very large time constant. The frequency response characteristic which the light-receiving device exhibits in this case is shown in FIG. 14(A), and as illustrated, there is a step-like portion in the vicinity of several to several hundred kHz.

If an optical signal having its intensity modulated as shown in FIG. 14(B) is input to the light-receiving device having such a frequency response characteristic, the device outputs an electrical signal of which the offset level rises with time, as shown in FIG. 14(C).

The rise with time in the offset level of the electrical signal output from the light-receiving device causes the following problems.

The first problem will be explained with reference to the case where optical communication is applied to data transfer between computers. In this type of data transfer, since the transmission distance is relatively short, no large dynamic range is required. Therefore, amplitude discrimination is performed by means of a fixed threshold, with a view to simplifying the optical receiving apparatus and thereby reducing the cost. In the case where the fixed-threshold amplitude discrimination is performed on the basis of an electrical signal whose offset level rises with time, however, the "0" level of the electrical signal output from the light-receiving device can sometimes exceed the threshold, as shown in FIG. 15(A). As a result, a problem arises in that a "0" signal is erroneously taken as a "1" signal, as shown in FIG. 15(B) (indicated by "ERROR" in FIG. 15(B)).

The second problem will be now explained.

In some optical receiving apparatus, the power supply voltage is lowered in order to reduce the power consumption, and in such apparatus, if a large-amplitude signal is input to the light-receiving device, a preamplifier which is arranged at a stage succeeding the light-receiving device becomes saturated. To avoid this, a logarithmic amplifier is used as the preamplifier. Specifically, a preamplifier is employed which has an input/output characteristic such that, for an input of a certain level or above, the preamplifier provides a flat output, as shown in FIG. 16(A). If, however, a signal which has a large amplitude and of which the offset level rises with time, as shown in FIG. 16(B), is input to the preamplifier, the original "0" level approaches the "1" level, as shown in FIG. 16(C), finally to such an extent that it is indistinguishable from the "1" level.

As conventional techniques for solving these problems, a circuit is known wherein the "0" level fluctuation of the output from the preamplifier is detected and is fed back to the preamplifier to thereby cancel the offset (papers C-502 for the 1995 convention of the Institute of Electronics, Information and Dommunication Engineers). Such conventional techniques are also disclosed in Japanese Patent Application Laid-Open Publications (KOKAI) No. 6-232916 and No. 6-232917.

In the conventional technique disclosed in the papers for the convention of the Electronics Society of the Electronic Information Communications Institute, however, when the "1" level is consecutively input, the feedback causes the "1" level to approach the "0" level, incurring the possibility of the "1" level being erroneously taken as the "0" level. Therefore, in the case of this conventional technique, it is necessary that the number of consecutive inputs of an identical code be restricted. On the other hand, the conventional techniques disclosed in Japanese Patent Application Laid-Open Publications (KOKAI) No. 6-232916 and No. 6-232917 require an extremely complicated circuit arrangement, and thus involve difficulties in reducing the power consumption or simplifying the circuit arrangement to thereby reduce the cost, etc.

In view of the above circumstances, the present invention provides means different from those employed in the conventional techniques, to solve the aforementioned problems caused by a rise in the offset of the light-receiving device.

SUMMARY OF THE INVENTION

An object of the present invention is to provide an optical receiving apparatus which can solve the problem that amplitude discrimination becomes impossible due to a rise in the offset of a light-receiving device, which permits amplitude discrimination even when an identical code is consecutively input, and which is simple in arrangement.

To achieve the above object, there is provided an optical receiving apparatus for receiving an optical signal and converting the received signal to an electrical signal. This optical receiving apparatus comprises a light-receiving device for converting an input optical signal to a current quantity, an offset detecting circuit for detecting a quantity of electricity indicative of an offset current quantity which corresponds to a zero level of the optical signal within the current quantity output from the light-receiving device, and a current subtracting circuit for reproducing the offset current quantity based on the quantity of electricity detected by the offset detecting circuit, and subtracting the reproduced offset current quantity from the current quantity output from the light-receiving device.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments according to the present invention will be hereinafter described with reference to the drawings.

Figure 1:
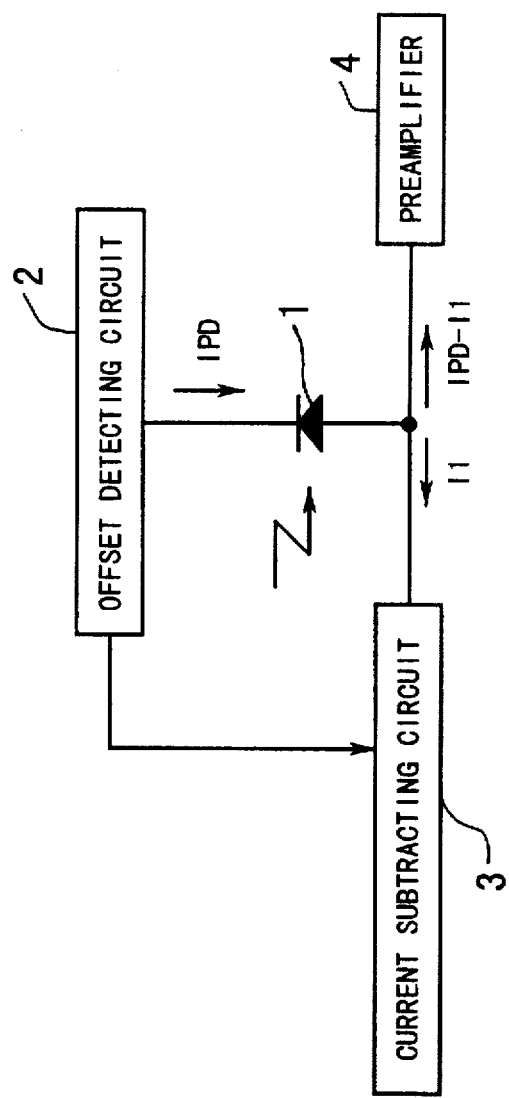
FIG. 1 is a diagram illustrating the principles of the present invention.

Referring first to FIG. 1, a theoretical arrangement of an optical receiving apparatus according to a first embodiment of the present invention will be explained. The first embodiment comprises a light-receiving device 1 for converting an input optical signal to a current quantity, an offset detecting circuit 2 for detecting a quantity of electricity indicative of an offset current quantity which corresponds to a zero level of the optical signal within the current quantity output from the light-receiving device 1, and a current subtracting circuit 3 for reproducing the offset current quantity based on the quantity of electricity detected by the offset detecting circuit 2, and subtracting the reproduced offset current quantity from the current quantity output from the light-receiving device 1.

In the above arrangement, the offset detecting circuit 2 comprises a parallel-connected circuit including a resistor and a capacitor. By suitably selecting the time constant of the parallel circuit, the offset detecting circuit 2 can detect a current quantity curve I2 almost similar to the curve of an offset current quantity I0 within a current quantity IPD output from the light-receiving device 1, as shown in FIG. 2(A).

Based on the current quantity curve I2, the current subtracting circuit 3 generates a subtractive current I1 having a curve nearly identical with that of the offset current quantity I0 (this is equivalent to "reproduction of the offset current quantity") , as shown in FIG. 2(B), and subtracts the subtractive current I1 from the current quantity IPD output from the light-receiving device 1. As a result, a current which has been subjected to offset compensation, as shown in FIG. 2(C), is input to a preamplifier 4.

Figure 3:
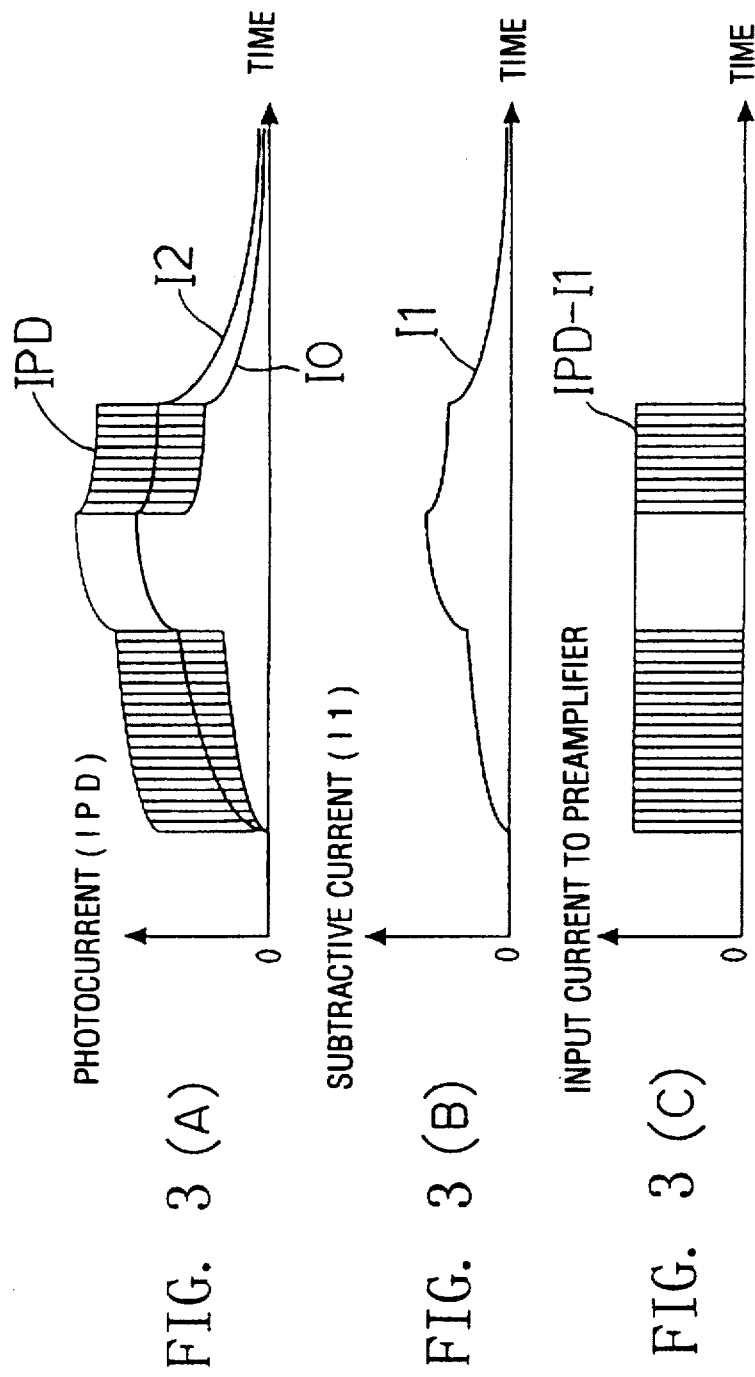
FIG. 3(A) is a diagram showing a current output from the light-receiving device when an identical code is consecutively input.
FIG. 3(B) is a diagram showing a subtractive current generated in accordance with the present invention when an identical code is consecutively input.
FIG. 3(C) is a diagram showing a current input to the preamplifier in accordance with the present invention when an identical code is consecutively input.

Even when the "1" level is consecutively input as shown in FIG. 3, the offset detecting circuit 2 can detect a current quantity curve I2 almost similar to the curve of the offset current quantity I0 of the light-receiving device 1, as shown in FIG. 3(A). Accordingly, based on the current quantity curve I2, the current subtracting circuit 3 generates a subtractive current I1 having a curve nearly identical with that of the offset current quantity I0, as shown in FIG. 3(B), and subtracts the subtractive current I1 from the current quantity IPD output from the light-receiving device 1, in the same manner as mentioned above. As a result, a current which has been subjected to the offset compensation, as shown in FIG. 3(C), is input to the preamplifier 4.

Thus, the problem that the amplitude discrimination becomes impossible due to a rise in the offset of the light-receiving device 1 can be solved, and moreover, an optical receiving apparatus is provided which permits amplitude discrimination even when supplied consecutively with an identical code and which is simple in arrangement.

Figure 4:
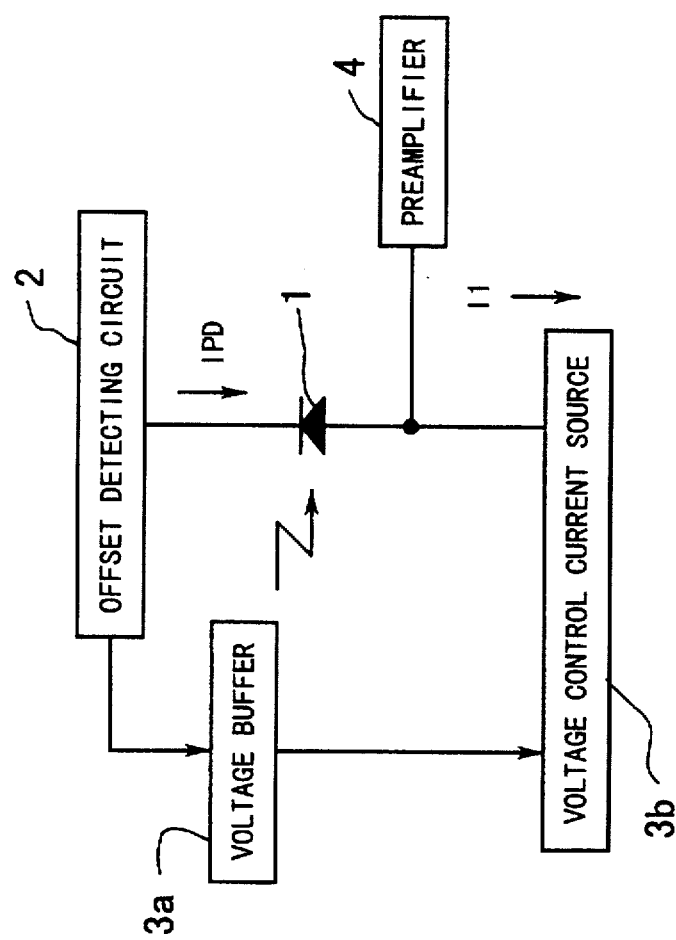
FIG. 4 is a block diagram showing an arrangement according to a first embodiment.
Figure 5:
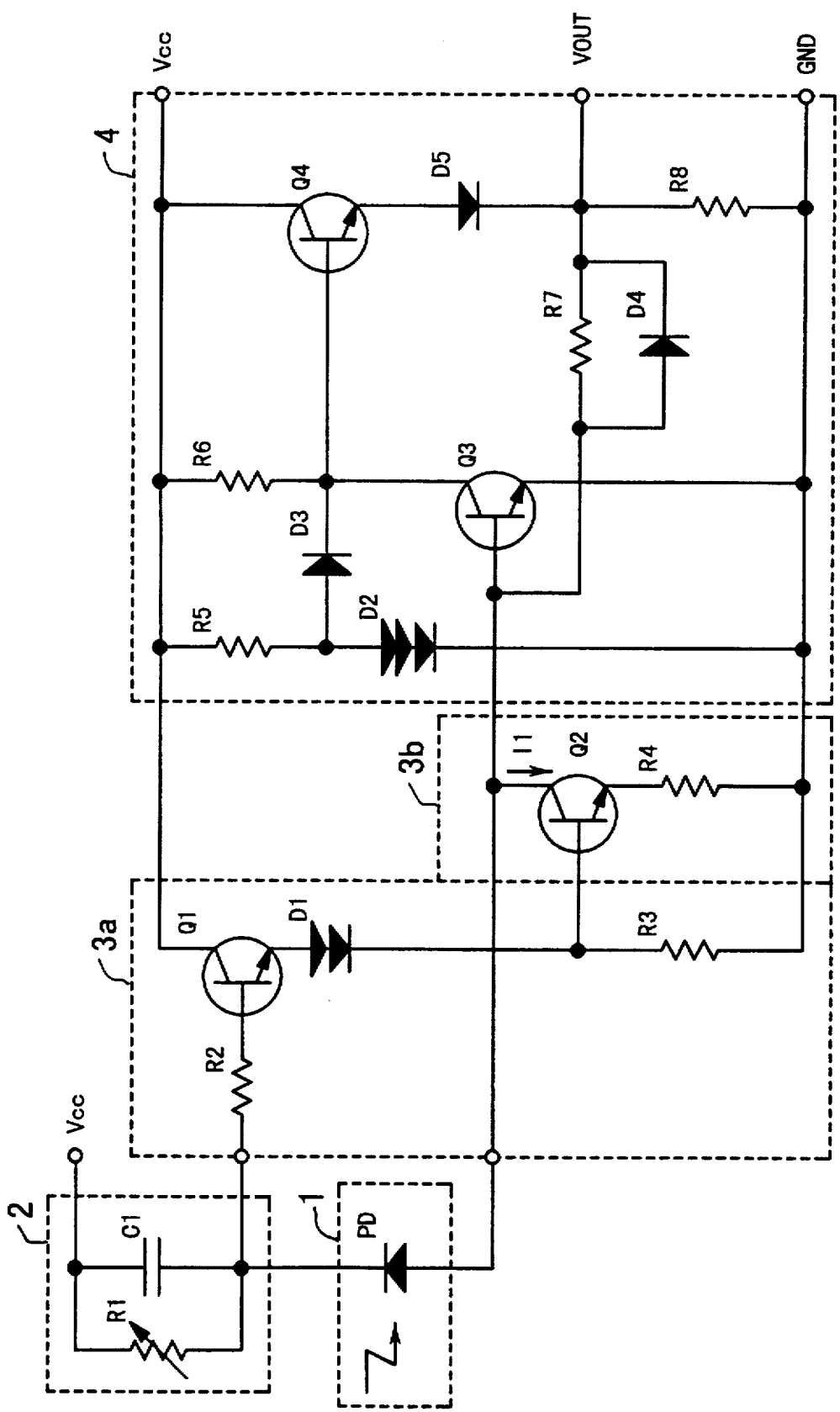
FIG. 5 is a diagram showing a circuit arrangement according to the first embodiment.

FIG. 4 is a block diagram showing the arrangement of the first embodiment in more detail. As seen from FIG. 4, the current subtracting circuit 3 comprises a voltage buffer 3a and a voltage control current source 3b. FIG. 5 is a circuit diagram corresponding to this block diagram.

As shown in FIG. 5, the light-receiving device 1 comprises a PIN photodiode PD, and the offset detecting circuit 2 is connected to the cathode of the photodiode PD. The offset detecting circuit 2 is a parallel-connected circuit including a variable resistor R1 and a capacitor C1. The anode of the photodiode PD is connected to the base of a transistor Q3 which is an input terminal of the preamplifier 4. The junction point between the light-receiving device 1 and the offset detecting circuit 2 is connected via a resistor R2 to the base of a transistor Q1 which is an input terminal of the voltage buffer 3a. The voltage buffer 3a comprises an emitter follower. The output terminal of the voltage buffer 3a is connected to the base of a transistor Q2 which is an input terminal of the voltage control current source 3b. The collector of the transistor Q2 of the voltage control current source 3b is connected to the base of the transistor Q3 of the preamplifier 4.

The operation of the circuit shown in FIG. 5 will be now described.

The parallel-connected circuit made up of the variable resistor R1 and the capacitor C1 integrates the current IPD flowing through the photodiode PD to detect a voltage value corresponding to the current quantity curve I2, as shown in FIG. 2(A). The form of the current quantity curve I2 varies as the resistance value of the variable resistor R1 is changed, and therefore, the resistance value of the variable resistor R1 is adjusted so that the form of the current quantity curve I2 may be similar to the curve of the offset current quantity I0 of the photodiode PD. In practice, while monitoring the output of the preamplifier 4, the resistance of the variable resistor R1 is adjusted to a value such that a waveform like the one shown in FIG. 2(C) is obtained.

When the voltage corresponding to the current quantity curve I2 is applied to the base of the transistor Q1 of the voltage buffer 3a, a voltage corresponding to the subtractive current I1 shown in FIG. 2(B) appears at the junction point between a diode D1, which is connected to the emitter of the transistor Q1, and a resistor R3. The transistor Q2 of the voltage control current source 3b generates a current corresponding to this voltage. The current thus generated corresponds to the subtractive current I1 shown in FIG. 2(B). Since the subtractive current I1 flows in a direction toward the collector of the transistor Q2, the current I1 is subtracted from the current IPD which originally is to flow from the photodiode PD to the base of the transistor Q3 of the preamplifier 4, and accordingly, the remaining current (IPD-I1) actually flows to the base of the transistor Q3.

The preamplifier 4 has an ordinary transimpedance type arrangement. A diode D4 constitutes a logarithmic amplifier for preventing saturation from being caused by the input of a large-amplitude signal, and a diode D3 is provided for preventing oscillation from occurring due to the input of a large-amplitude signal.

In this manner, the problem that the amplitude discrimination becomes impossible due to a rise in the offset current quantity I0 of the photodiode PD is solved, and since the form of the subtractive current I1 curve can be made almost similar to that of the offset current quantity I0 curve even in the case where an identical code is consecutively input, the amplitude discrimination is available. In addition, the circuit arrangement is simple and can be easily implemented by an IC.

A second embodiment will be now described.

Figure 6:
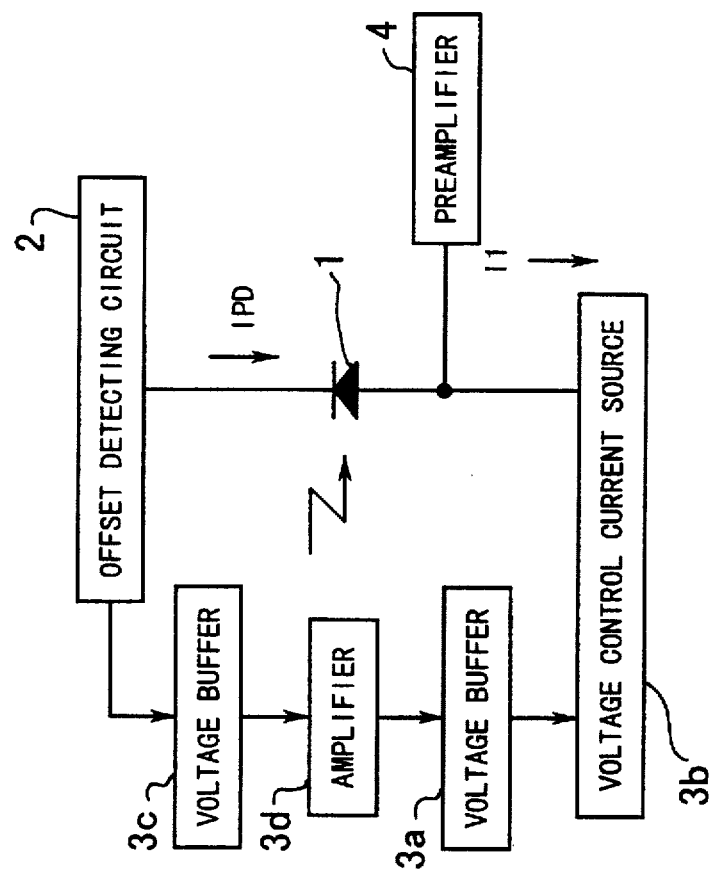
FIG. 6 is a block diagram showing an arrangement according to a second embodiment.
Figure 7:
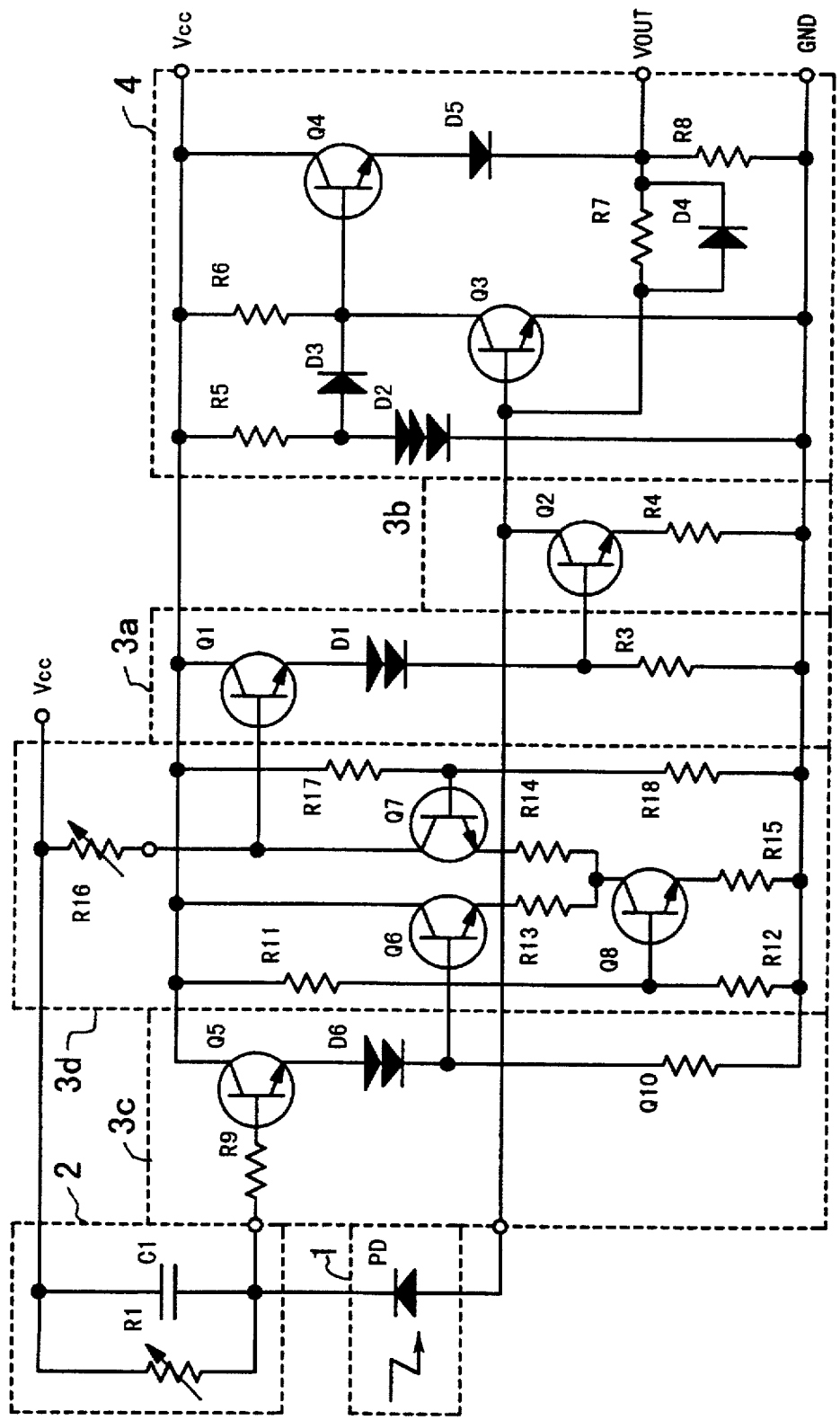
FIG. 7 is a diagram showing a circuit arrangement according to the second embodiment.

FIG. 6 is a block diagram showing an arrangement according to the second embodiment, and FIG. 7 is a circuit diagram corresponding to the block diagram. The arrangement of the second embodiment is basically identical with that of the first embodiment; therefore, identical reference numerals are used to denote corresponding components and description of such components is omitted.

In the second embodiment, a voltage buffer 3c and an amplifier 3d are additionally provided as compared with the arrangement of the first embodiment. Specifically, as shown in FIG. 6, the voltage buffer 3c and the amplifier 3d are connected between the offset detecting circuit 2 and the voltage buffer 3a. To explain this with reference to the circuit arrangement, as shown in FIG. 7, the junction point between the light-receiving device 1 and the offset detecting circuit 2 is connected via a resistor R9 to the base of a transistor Q5 which is an input terminal of the voltage buffer 3c. The output terminal of the voltage buffer 3c is connected to the base of a transistor Q6 which is an input terminal of the amplifier 3d. The collector of a transistor Q7, which is the output terminal of the amplifier 3d, is connected to the base of the transistor Q1 of the voltage buffer 3a. The amplifier 3d is a differential amplifier whose gain can be varied by changing the resistance value of a variable resistor R16.

Thus, by adding the voltage buffer 3c and the amplifier 3d and by adjusting the amount of amplification of the amplifier 3d, it is possible to adjust the magnitude of the subtractive current I1 generated by the voltage control current source 3b.

In the second embodiment, the amplifier 3d is additionally provided so that the magnitude of the subtractive current I1 may be adjusted in the incremental direction. Depending on the magnitude relationship between the form of the subtractive current I1 curve and the form of the offset current quantity I0 curve of the photodiode PD, however, an attenuator capable of varying its amount of attenuation may possibly preferably be provided in place of the amplifier 3d so that the magnitude of the subtractive current I1 can be adjusted in the decremental direction.

A third embodiment will be now described.

Figure 8:
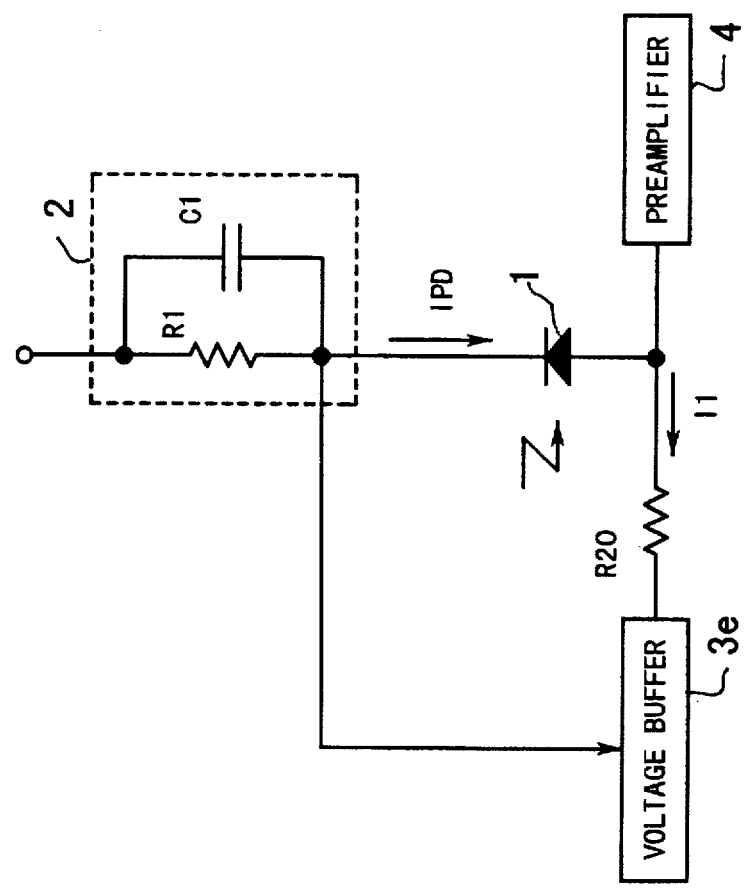
FIG. 8 is a block diagram showing an arrangement according to a third embodiment.
Figure 9:
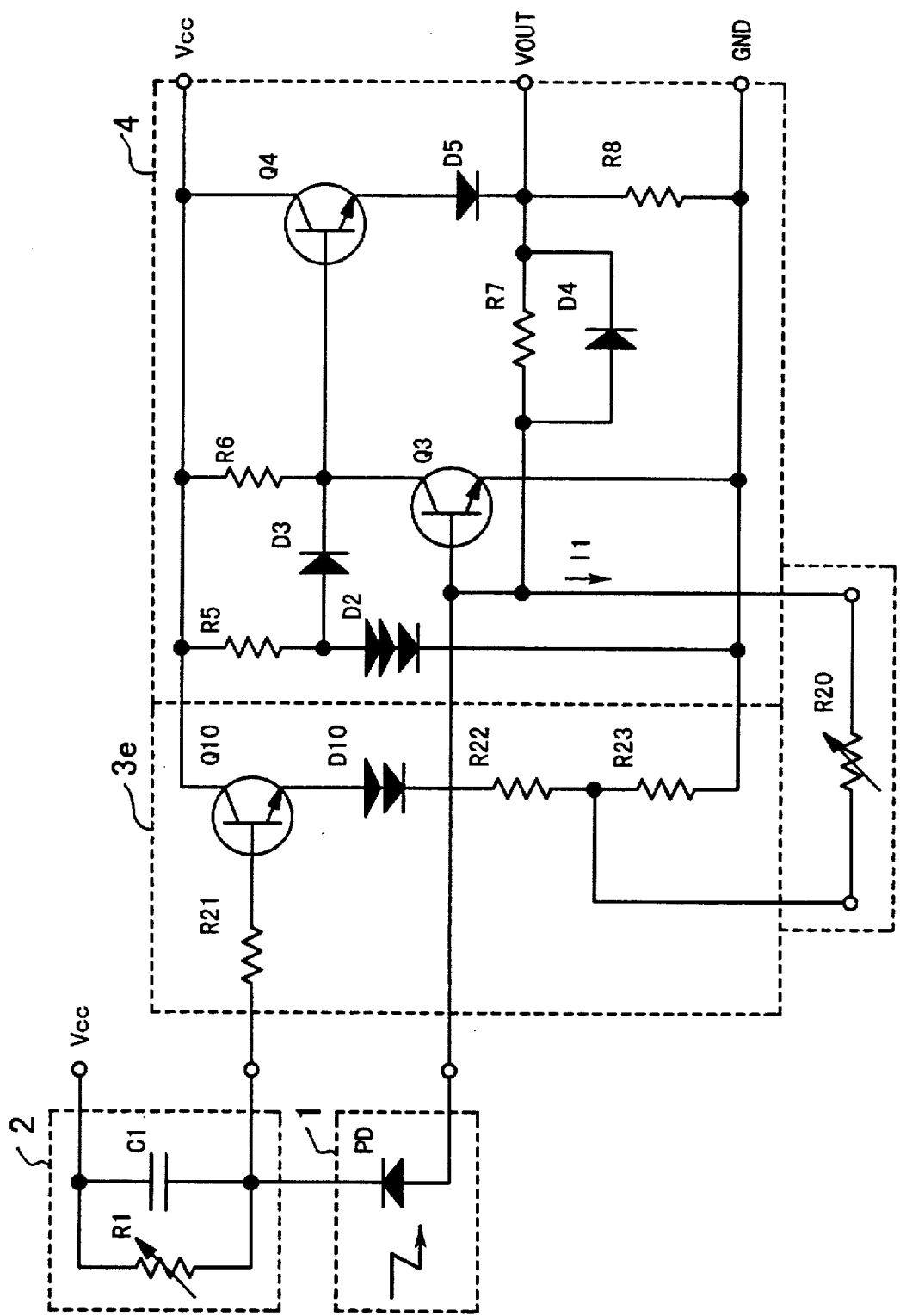
FIG. 9 is a diagram showing a circuit arrangement according to the third embodiment.

FIG. 8 is a block diagram showing an arrangement according to the third embodiment, and FIG. 9 is a circuit diagram corresponding to the block diagram. The arrangement of the third embodiment is basically identical with that of the first embodiment; therefore, identical reference numerals are used to denote corresponding components and description of such components is omitted.

According to the third embodiment, the current subtracting circuit 3 in the first embodiment is made up of a voltage buffer 3e and a resistor R20. To explain this with reference to the circuit arrangement, as shown in FIG. 9, the junction point between the light-receiving device 1 and the offset detecting circuit 2 is connected via a resistor R21 to the base of a transistor Q10 which is an input terminal of the voltage buffer 3e. The output terminal of the voltage buffer 3e is connected to one end of the resistor R20, the other end of which is connected to the base of the transistor Q3 of the preamplifier 4.

The following describes how the subtractive current I1 is subtracted via the resistor R20 from the current quantity IPD which originally is to flow to the base of the transistor Q3 of the preamplifier 4. It is here assumed that the offset detecting circuit 2 outputs a voltage ΔV, which is then input to the voltage buffer 3e. The gain of the voltage buffer 3e is "1" in principle, and accordingly, the voltage ΔV is directly applied to the one end of the resistor R20. On the other hand, the preamplifier 4 is a transimpedance type and thus involves feedback via the resistor R7; therefore, the potential at the other end of the resistor R20 does not undergo fluctuation. Consequently, the resistor R20 is applied with the voltage ΔV, providing the subtractive current I1 equal to ΔV/R20. Here, the relation ΔV∝R1 stands, and hence I1∝R1/R20. Therefore, the magnitude of the subtractive current I1 can be set by means of the ratio of the resistance R1 to the resistance R20.

A fourth embodiment will be now described.

Figure 10:
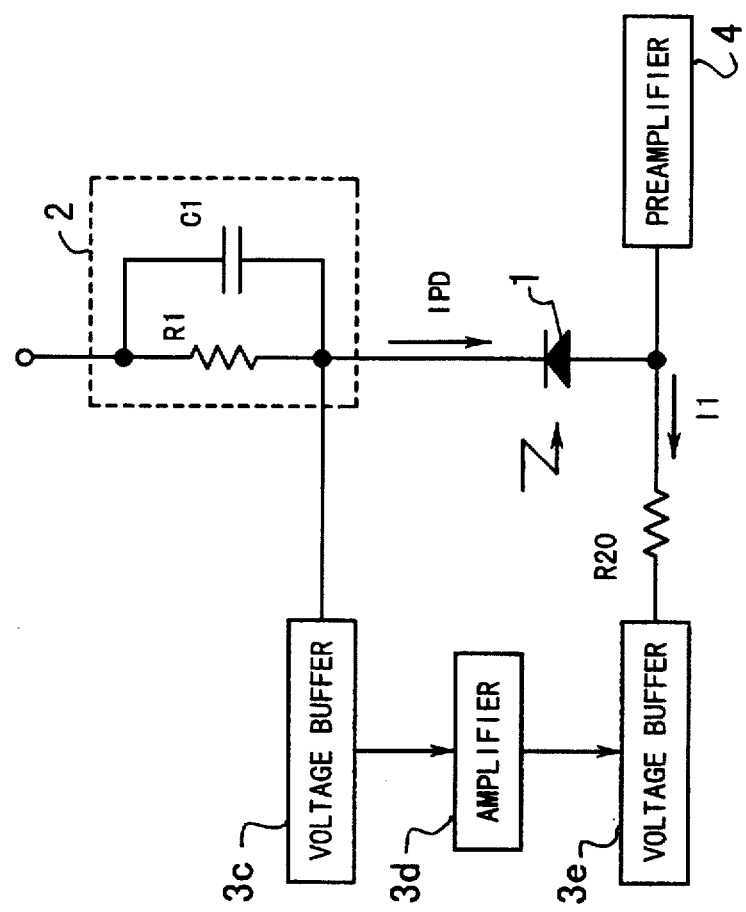
FIG. 10 is a block diagram showing an arrangement according to a fourth embodiment.
Figure 11:
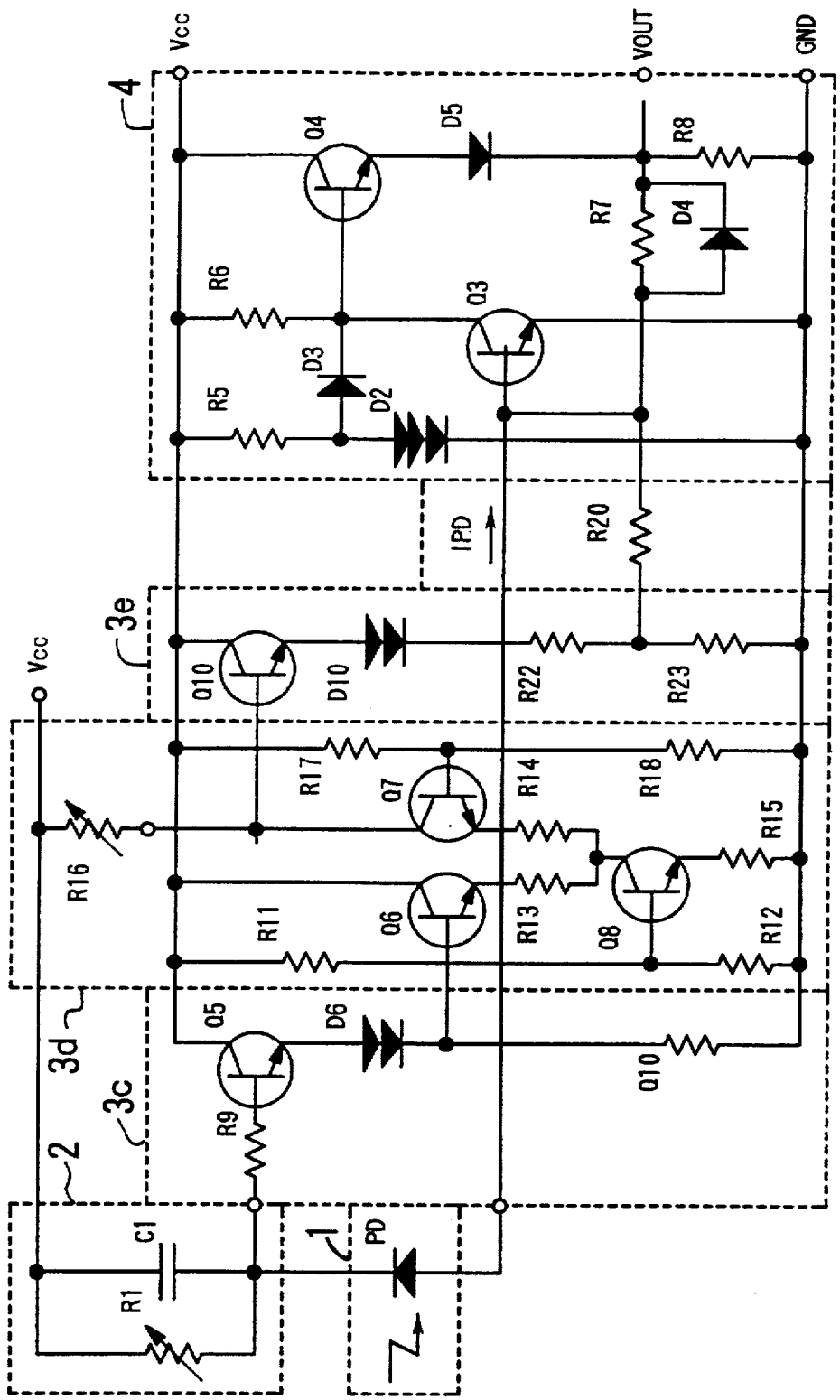
FIG. 11 is a diagram showing a circuit arrangement according to the fourth embodiment.

FIG. 10 is a block diagram showing an arrangement according to the fourth embodiment, and FIG. 11 is a circuit diagram corresponding to the block diagram. According to the fourth embodiment, the arrangement of the third embodiment is additionally provided with the voltage buffer 3c and the amplifier 3d used in the second embodiment. Therefore, in the description of the fourth embodiment, identical reference numerals are used to denote identical components appearing in the third and second embodiments and description of such components is omitted.

In the fourth embodiment, the magnitude of the subtractive current I1 can be adjusted through the amplifier 3d, and therefore, the resistance value of the resistor R20 may be fixed. Using a fixed resistor as the resistor R20 can eliminate distributed capacitance that narrows the band, and also makes it easy to constitute the apparatus by an IC.

Also in the fourth embodiment, an attenuator capable of varying its amount of attenuation may be provided, in place of the amplifier 3d, so that the magnitude of the subtractive current I1 can be adjusted in the decremental direction.

A fifth embodiment will be now described.

Figure 2:
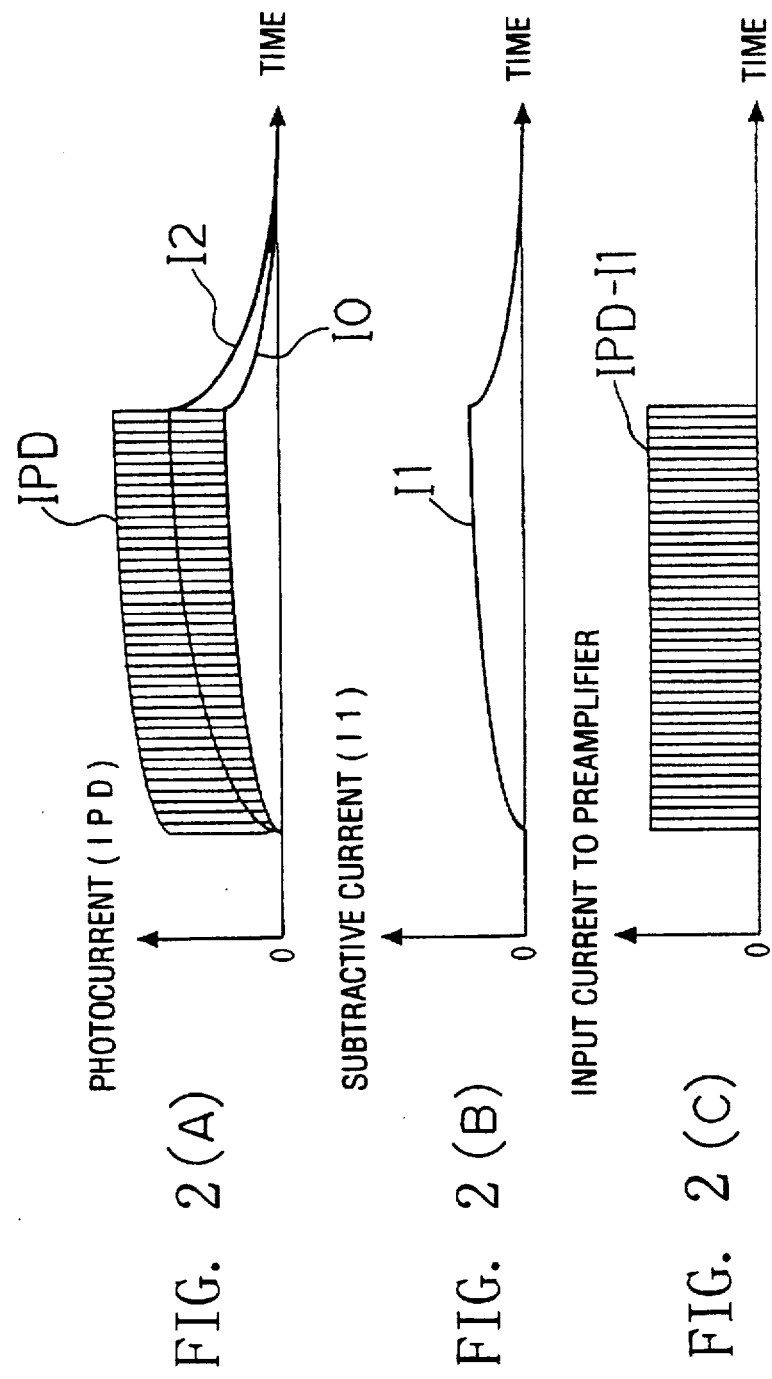
FIG. 2(A) is a diagram showing a current output from a light-receiving device.
FIG. 2(B) is a diagram showing a subtractive current generated in accordance with the present invention.
FIG. 2(C) is a diagram showing a current input to a preamplifier according to the present invention.
Figure 12:
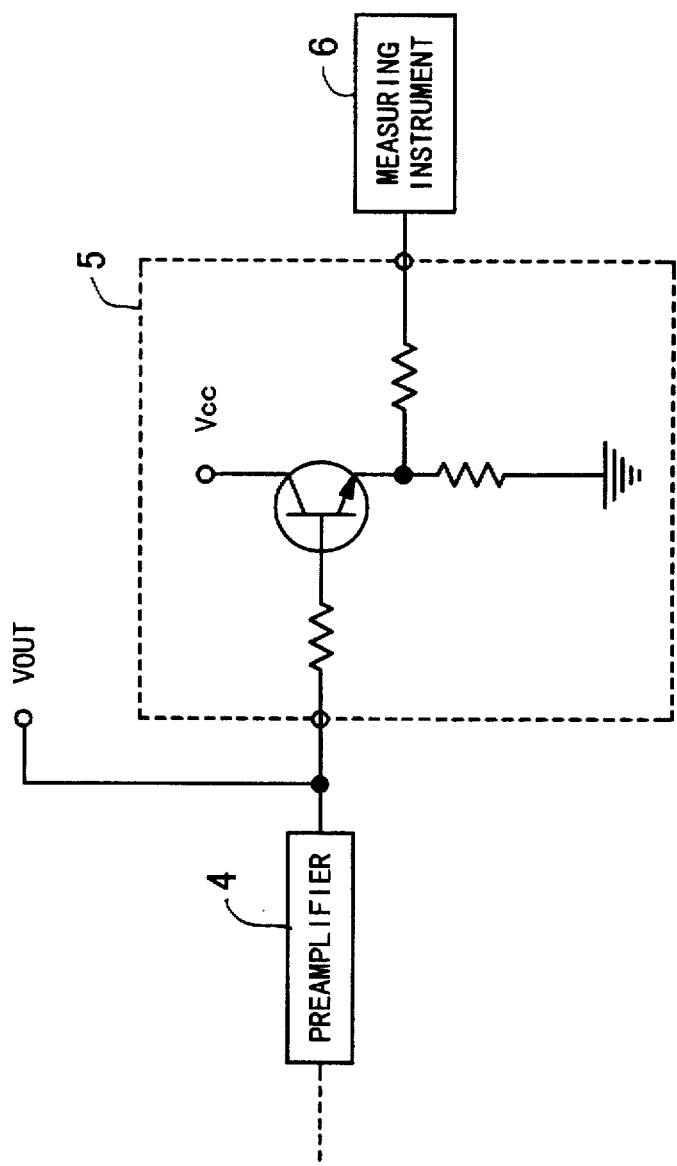
FIG. 12 is a block diagram showing an arrangement according to a fifth embodiment.
Figure 13:
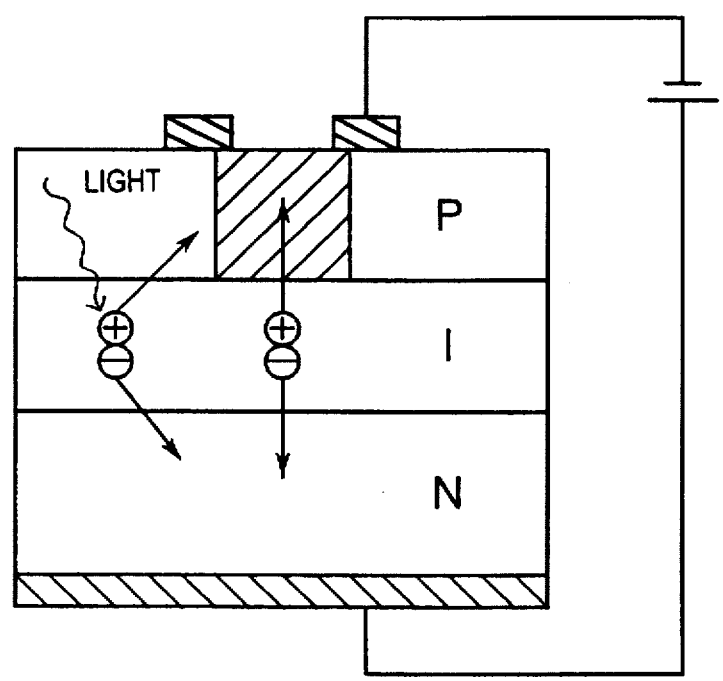
FIG. 13 is a diagram showing a sectional structure of a PIN diode.
Figure 14A:
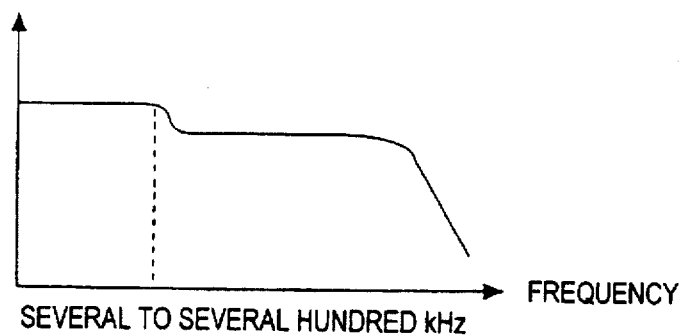
FIG. 14(A) is a diagram showing a frequency response characteristic of a light-receiving device.
Figure 14B:
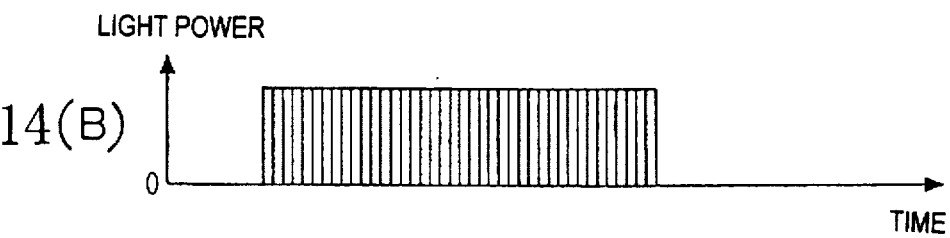
FIG. 14(B) is a diagram showing an optical signal input to the light-receiving device.
Figure 14C:
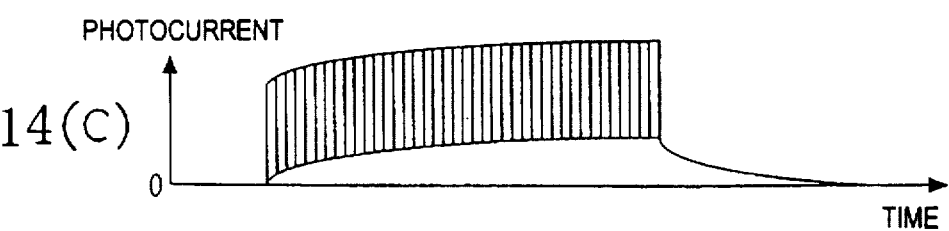
FIG. 14(C) is a diagram showing an electrical signal output from the light-receiving device.
Figures 15A, 15B:
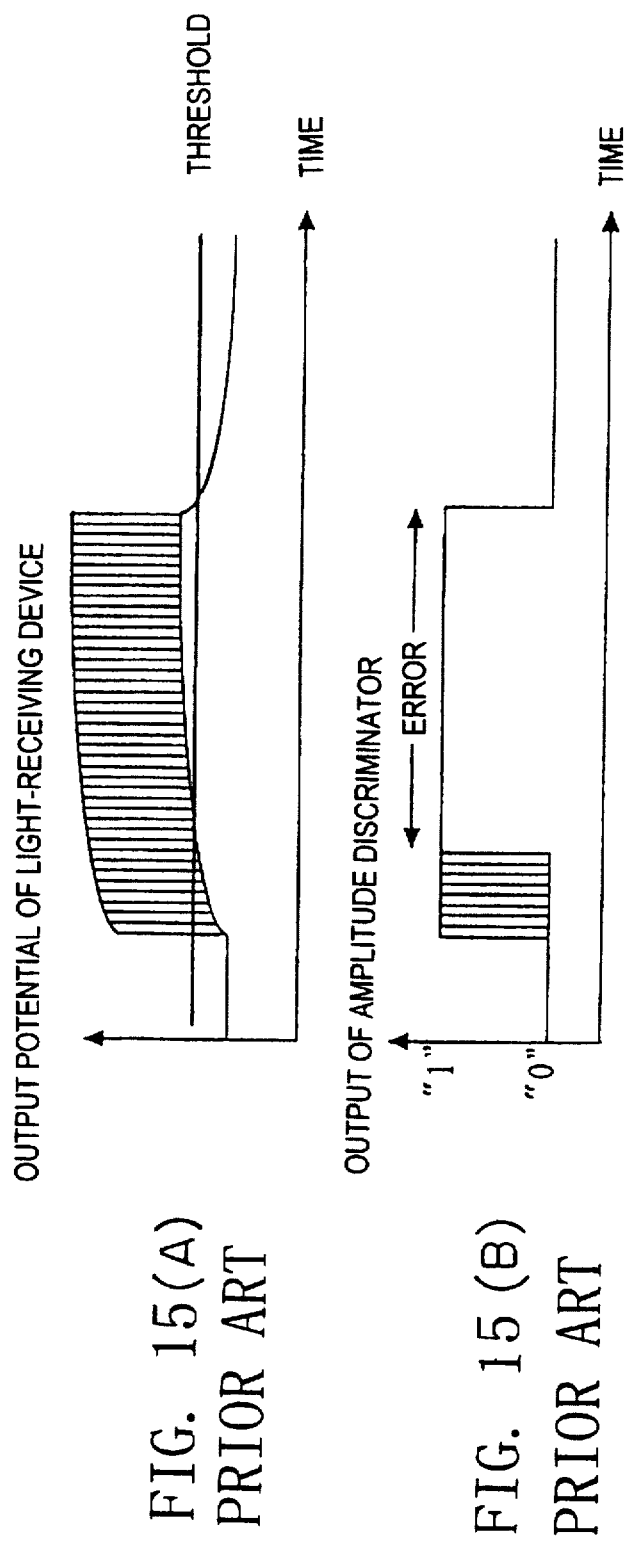
FIG. 15(A) is a diagram showing a conventionally observed relationship between an output of the light-receiving device and an amplitude discrimination threshold.
FIG. 15(B) is a diagram showing an output of a conventional amplitude discriminator.
Figures 16A, 16B, 16C:
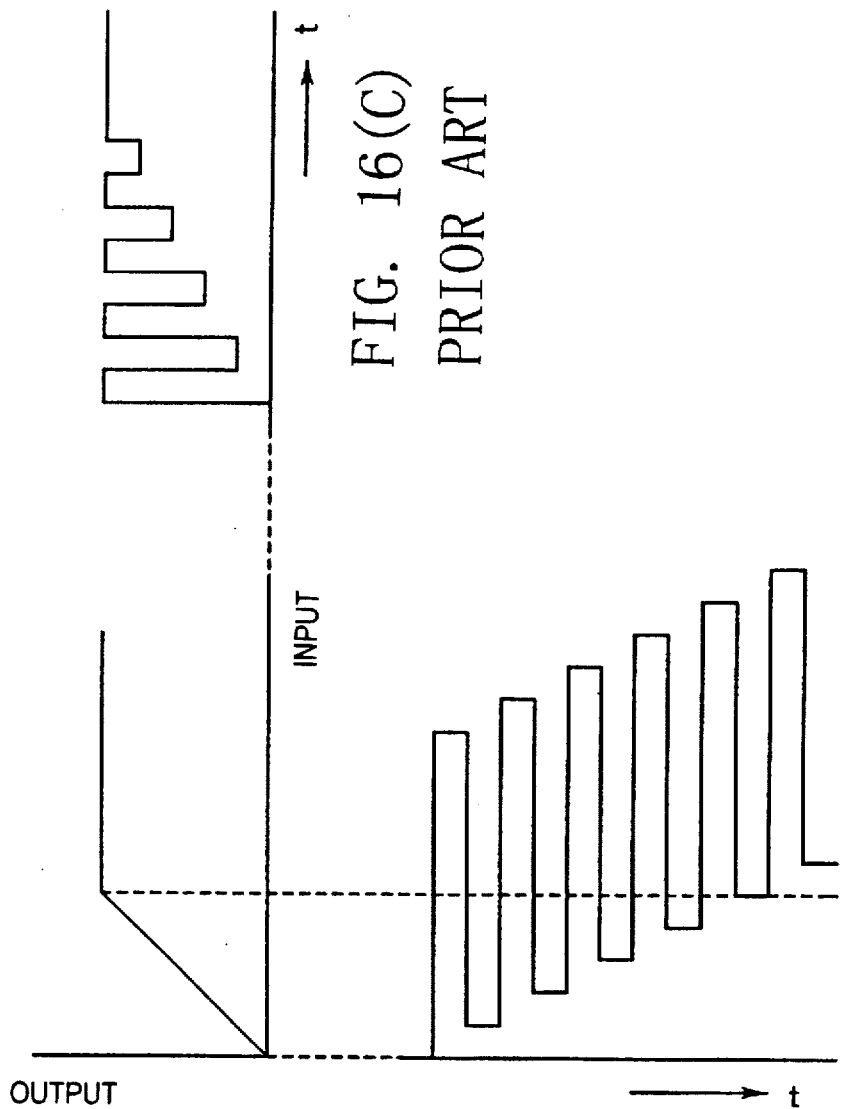
FIG. 16(A) is a diagram showing an input/output characteristic of a conventional logarithmic preamplifier.
FIG. 16(B) is a diagram showing a waveform of a large-amplitude signal input to the conventional preamplifier.
FIG. 16(C) is a diagram showing a signal waveform output from the conventional preamplifier.

FIG. 12 is a block diagram showing an arrangement according to the fifth embodiment. In all embodiments described above, an adjustment is required such that the form of the curve of the subtractive current I1 shown in FIG. 2 or 3 becomes close to that of the curve of the offset current quantity I0 of the photodiode PD, and this adjustment is in practice carried out so as to obtain a waveform as shown in FIG. 2(C) while monitoring the output of the preamplifier 4. However, the output impedance of the preamplifier 4 is high while the input impedance of a measuring instrument 6 for monitoring the output, such as an oscilloscope, must be low in order to permit handling of high-frequency signals, thus producing a situation that with the arrangement per se, the output of the preamplifier 4 cannot be monitored. To eliminate the inconvenience, the output terminal of the preamplifier 4 is branched and an impedance converting circuit 5 is connected to a branch output terminal. This impedance converting circuit 5 coverts the output impedance of the preamplifier 4 to, for example, a low output-impedance of about 50 Ω, which is then input to the low input-impedance measuring instrument 6 connected thereto. Consequently, it is possible to adjust with ease the aforementioned subtractive current I1 and also to facilitate the monitoring of optical signals, etc.

Although the above embodiments are explained with reference to specific circuits shown in FIGS. 5, 7, 9, 11 and 12, these circuits are shown for the purpose of illustration only and other circuit arrangements may be employed insofar as they provide similar functions.

In the individual embodiments described above, the offset detecting circuit 2 is constituted by a parallel circuit including the capacitor C1 and the resistor R1. Alternatively, the offset detecting circuit 2 may be constituted by a plurality of such parallel circuits connected in series with one another, depending on the characteristics of the photodiode PD.

As described above, according to the present invention, a quantity of electricity indicative of the offset current quantity which corresponds to the zero level of an optical signal within the current quantity output from the light-receiving device is detected, and based on the detected quantity of electricity, the offset current quantity is reproduced. The offset current quantity thus reproduced is subtracted from the current quantity output from the light-receiving device.

Consequently, it is possible to provide an optical receiving apparatus which permits amplitude discrimination even when the offset of the light-receiving device rises or when an identical code is consecutively input, which is remarkably simplified in circuit arrangement, and which is low in power consumption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical receiving apparatus for receiving an optical signal and converting the received signal to an electrical signal, comprising:
   a light-receiving device for converting an input optical signal to a current quantity;
   an offset detecting circuit for detecting a quantity of electricity indicative of an offset current quantity which corresponds to a zero level of the optical signal within the current quantity output from said light-receiving device; and
   a current subtracting circuit for reproducing the offset current quantity based on the quantity of electricity detected by said offset detecting circuit, and subtracting the reproduced offset current quantity from the current quantity output from said light-receiving device.

2. The optical receiving apparatus according to claim 1, wherein said current subtracting circuit includes
   a voltage buffer for adjusting the quantity of electricity detected by said offset detecting circuit and outputting a voltage value, and
   a voltage control current source for generating a quantity of current corresponding to the voltage value output from said voltage buffer.

3. The optical receiving apparatus according to claim 1, wherein said current subtracting circuit includes
   a voltage buffer for adjusting the quantity of electricity detected by said offset detecting circuit and outputting a voltage value,
   an amplifier for amplifying the voltage value output from said voltage buffer by a predetermined gain, and
   a voltage control current source for generating a quantity of current corresponding to an output value of said amplifier.

4. The optical receiving apparatus according to claim 1, wherein said current subtracting circuit includes
   a voltage buffer for adjusting the quantity of electricity detected by said offset detecting circuit and outputting a voltage value,
   an attenuator for attenuating the voltage value output from said voltage buffer by a predetermined attenuation amount, and
   a voltage control current source for generating a quantity of current corresponding to an output value of said attenuator.

5. The optical receiving apparatus according to claim 1, wherein said offset detecting circuit comprises a parallel-connected circuit including a first resistor and a capacitor, and said current subtracting circuit includes a voltage buffer for adjusting the quantity of electricity detected by said offset detecting circuit and outputting a voltage value, and a second resistor connected between an output terminal of said voltage buffer and a junction point between said light-receiving device and a preamplifier.

6. The optical receiving apparatus according to claim 1, wherein said offset detecting circuit comprises a parallel-connected circuit including a first resistor and a capacitor, and said current subtracting circuit includes a first voltage buffer for adjusting the quantity of electricity detected by said offset detecting circuit and outputting a voltage value, an amplifier for amplifying the voltage value output from said first voltage buffer by a predetermined gain, a second voltage buffer for performing voltage adjustment of a voltage value output from said amplifier, and a second resistor connected between an output terminal of said second voltage buffer and a junction point between said light-receiving device and a preamplifier.

7. The optical receiving apparatus according to claim 1, wherein said offset detecting circuit comprises a parallel-connected circuit including a first resistor and a capacitor, and said current subtracting circuit includes a first voltage buffer for adjusting the quantity of electricity detected by said offset detecting circuit and outputting a voltage value, an attenuator for attenuating the voltage value output said first voltage buffer by a predetermined attenuation amount, a second voltage buffer for performing voltage adjustment of a voltage value output from said attenuator, and a second resistor connected between an output terminal of said second voltage buffer and a junction point between said light-receiving device and a preamplifier.

8. An optical receiving apparatus for receiving an optical signal and converting the received signal to an electrical signal, comprising:

a light-receiving device for converting an input optical signal to a current quantity;

an offset detecting circuit for detecting a quantity of electricity indicative of an offset current quantity which corresponds to a zero level of the optical signal within the current quantity output from said light-receiving device;

a current subtracting circuit for reproducing the offset current quantity based on the quantity of electricity detected by said offset detecting circuit, and subtracting the reproduced offset current quantity from the current quantity output from said light-receiving device; and an impedance converting circuit connected to an output terminal of a preamplifier, for converting an output impedance of the preamplifier to a low impedance.

* * * * *